US010313918B2

(12) United States Patent
Leicht et al.

(10) Patent No.: US 10,313,918 B2
(45) Date of Patent: Jun. 4, 2019

(54) MANAGEMENT OF RECEIVED INTERNET PROTOCOL PACKET BUNDLING FOR REAL TIME SERVICES

(71) Applicant: Intel IP Corporation, Santa Clara, CA (US)

(72) Inventors: Hans Juergen Leicht, Unterleinleiter (DE); Mohamed Hassan Helmy Khalil, Munich (DE); Mohamed Amin Nassar, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 72 days.

(21) Appl. No.: 15/378,144

(22) Filed: Dec. 14, 2016

(65) Prior Publication Data

US 2018/0167841 A1    Jun. 14, 2018

(51) Int. Cl.
*H04L 12/26* (2006.01)
*H04W 28/02* (2009.01)
(Continued)

(52) U.S. Cl.
CPC ....... *H04W 28/0268* (2013.01); *H04L 1/0007* (2013.01); *H04L 47/00* (2013.01);
(Continued)

(58) Field of Classification Search
CPC ..... H04L 5/0032; H04L 47/10; H04L 1/0007; H04L 47/365; H04L 65/80; H04L 65/608;
(Continued)

(56) References Cited

U.S. PATENT DOCUMENTS 9,813,939 B1 * 11/2017 Marupaduga ..... H04W 28/0268
2004/0148396 A1    7/2004 Meyer et al.
(Continued)

FOREIGN PATENT DOCUMENTS

WO    2013138043 A1    9/2013

OTHER PUBLICATIONS

International Search Report based on application No. PCT/US2017/060738 (8 pages) dated Feb. 8, 2018 (Reference Purpose Only).

*Primary Examiner* — Harun Chowdhury
(74) *Attorney, Agent, or Firm* — Viering, Jentschura & PartnermbB

(57) ABSTRACT

Disclosed is a method for managing Internet Protocol Packet bundling comprising determining an operation of a real-time critical service ("RTCS") on a mobile device; determining a data management indicator for the RTCS; where a RTCS is operating, and based on the data management indicator, determining a maximum number of Internet Protocol Packets for bundled delivery from a first layer of a protocol stack to a second layer of the protocol stack; receiving a number of Internet Protocol Packets totaling the maximum number of Internet Protocol Packets for bundled delivery; where the maximum number of Internet Protocol Packets for bundled delivery is greater than one, bundling the number of Internet Protocol Packets, and delivering the number of Internet Protocol Packets the first layer of the protocol stack to the second layer of the protocol stack.

20 Claims, 7 Drawing Sheets

(51) Int. Cl.
  *H04W 28/06*   (2009.01)
  *H04L 12/805*  (2013.01)
  *H04L 1/00*    (2006.01)
  *H04L 12/70*   (2013.01)
  *H04L 29/08*   (2006.01)
  *H04L 29/06*   (2006.01)
(52) U.S. Cl.
  CPC .......... *H04L 47/365* (2013.01); *H04L 65/608* (2013.01); *H04L 65/80* (2013.01); *H04L 69/321* (2013.01); *H04W 28/065* (2013.01)
(58) Field of Classification Search
  CPC   H04L 69/321; H04W 28/0268; H04W 28/06; H04W 28/065; H04W 52/0216; H04W 72/0446; H04W 72/1231; H04W 72/1236; H04W 28/0236
  USPC ........ 370/328, 329, 336, 352, 474, 252, 470
  See application file for complete search history.

(56) References Cited

U.S. PATENT DOCUMENTS

| | | | |
|---|---|---|---|
| 2006/0222010 | A1   | 10/2006 | Bosch et al. |
| 2006/0277315 | A1   | 12/2006 | Garcia et al. |
| 2007/0230507 | A1   | 10/2007 | Lingafelt et al. |
| 2009/0059853 | A1\* | 3/2009  | Kim ........................ H04L 47/10 370/329 |
| 2010/0135326 | A1\* | 6/2010  | Ray ..................... H04W 28/065 370/474 |
| 2014/0362764 | A1\* | 12/2014 | Aksu .................... H04L 65/1069 370/328 |
| 2014/0362832 | A1\* | 12/2014 | Rudolf .............. H04W 72/0446 370/336 |
| 2017/0164282 | A1\* | 6/2017  | Zhang ............... H04W 72/1236 |
| 2017/0359829 | A1\* | 12/2017 | Tabet .................. H04W 72/042 |
| 2018/0103468 | A1\* | 4/2018  | Li ..................... H04W 72/0446 |

\* cited by examiner

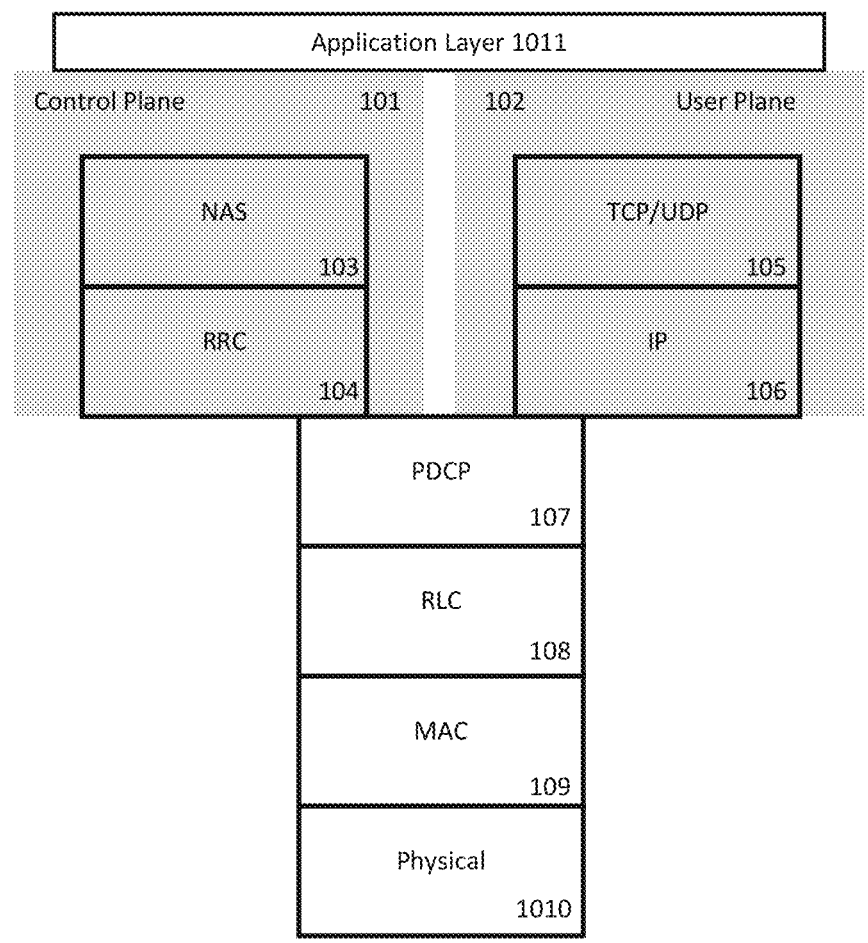
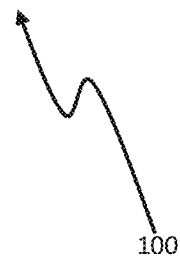
Fig. 1

| QCI | Priority Level | Related Services |
|---|---|---|
| 1 | 2 | Voice, Conversational 301 |
| 2 | 4 | Video, Conversational 302 |
| 3 | 3 | Gaming, Real-Time 303 |
| 4 | 5 | Video, Non-Conversational (e.g. Buffered Streaming) |
| 5 | 1 | IMS Signaling |
| 6 | 6 | Video, Buffered Streaming, TCP-Based, e.g. web, email, chat, ftp, p2p |
| 7 | 7 | Voice or Video, Live Streaming, e.g., in interactive gaming |
| 8 | 8 | Video, Buffered Streaming, TCP-Based, e.g. web, email, chat, ftp, p2p |
| 9 | 9 | Video, Buffered Streaming, TCP-Based, e.g. web, email, chat, ftp, p2p |

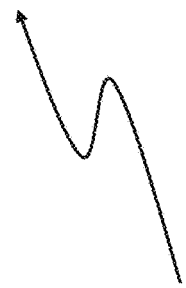

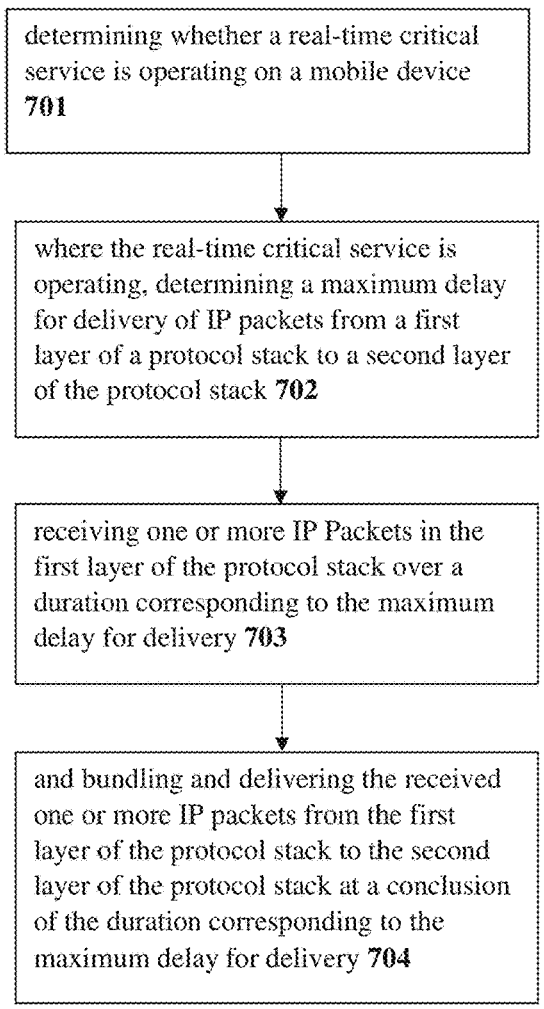
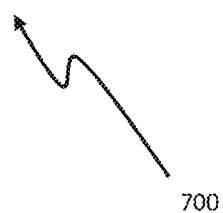
Fig. 7

MANAGEMENT OF RECEIVED INTERNET PROTOCOL PACKET BUNDLING FOR REAL TIME SERVICES

TECHNICAL FIELD

Various aspects relate generally to methods and devices concerning bundling of Internet Protocol Packets for transfers between protocol stack layers.

BACKGROUND

With the maturation of Long Term Evolution ("LTE") wireless communications systems, there is a need to manage steadily increasing data rates while reducing power consumption. One known area for reduced power consumption relates to the forwarding of received data to other protocol stack layers in each transmission time interval ("TTI"). Specifically, it is known to receive Internet Protocol Packets and, rather than forwarding the Internet Protocol Packets in each TTI, the LTE protocol stack bundles the received Internet Protocol Packets and forwards them to the application layer only once every n-th TTI. This procedure is known as Internet Protocol Packet Bundling. When applied, it reduces the frequency of a full data path between protocol stack layers, which itself results in power savings. Yet, this benefit in power consumption comes with the cost of additional delay in forwarding received Internet Protocol Packets. For services like internet browsing and file transfer, a few milliseconds of delay do not significantly affect performance and can be easily tolerated. For real-time critical services, however, such as Voice over Internet Protocol, non-buffered streaming video, or gaming data, even minimal delay can be undesirable and can result in poor or unacceptable performance.

SUMMARY

This Disclosure comprises a method and circuit configuration to detect when timing critical services are running and reduce or disable Internet Protocol Packet Bundling, thereby emphasizing timing and consistency of delivery over power-savings. Because universal disabling of Internet Protocol Packet Bundling would eliminate the established power-savings that Internet Protocol Packet Bundling provides, there is utility in recognizing services for which real-time data delivery is preferred over power-savings, and temporarily reducing or turning off Internet Protocol Packet Bundling as needed for these services. For example, services such as Internet Protocol Packet-based voice services, non-buffered streaming video, and real time gaming are especially sensitive to latency and may benefit from temporary reduction or elimination of Internet Protocol Packet Bundling. For some circumstances, such as during the use of these services, disabling Internet Protocol Packet Bundling eliminates a disadvantage that was designed to reduce power consumption.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the Disclosure. In the following description, various aspects of the Disclosure are described with reference to the following drawings, in which:

FIG. 1 shows a protocol stack for a user equipment;

FIG. 3 shows a Quality of Service Class Identifiers ("QCI") chart for data services;

FIG. 7 shows a method for management of Internet Protocol Packet Bundling.

DETAILED DESCRIPTION

Figure 2:
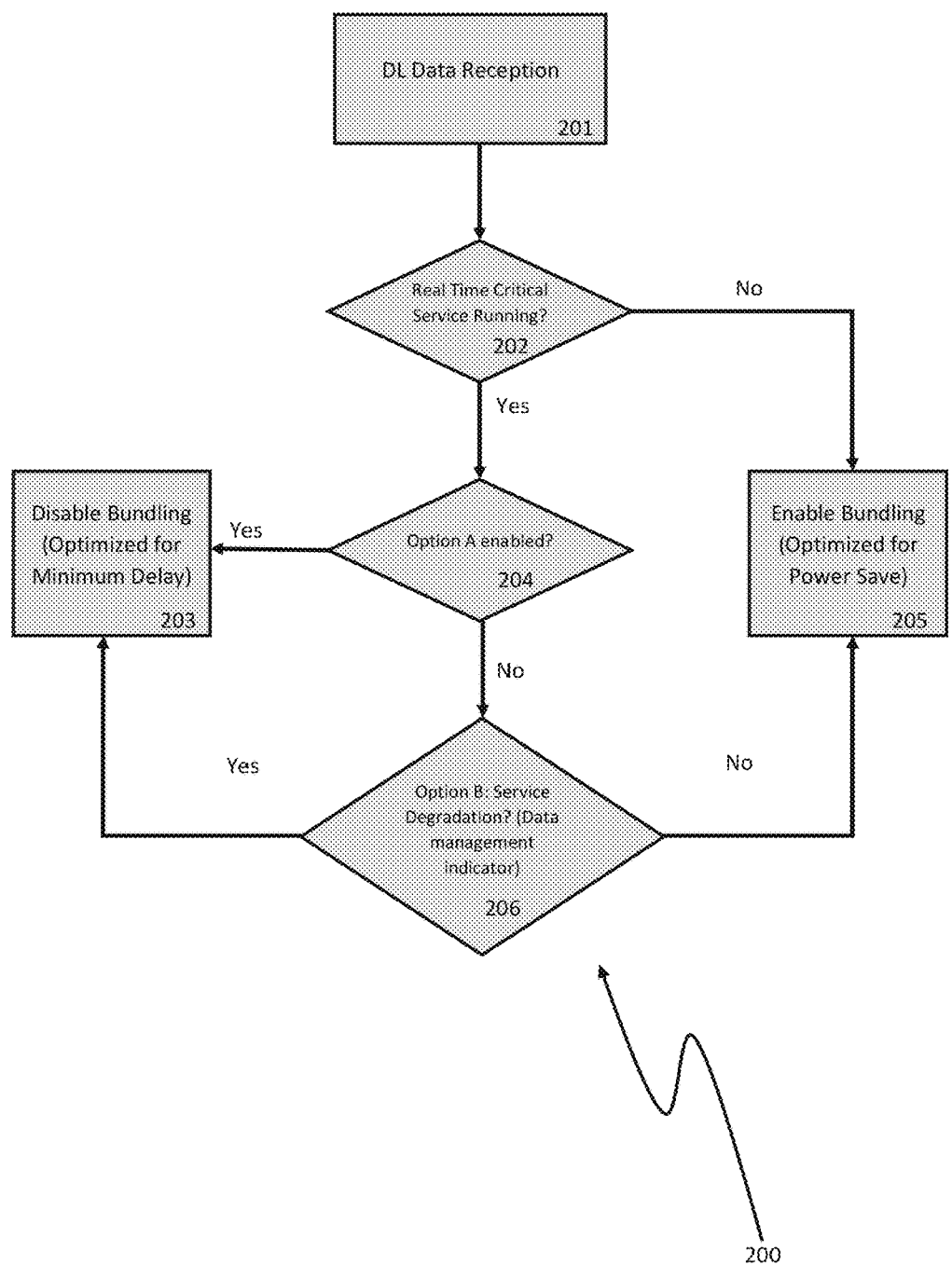
FIG. 2 shows a first flowchart for management of Internet Protocol Packet Bundling.

The following detailed description refers to the accompanying drawings that show, by way of illustration, specific details and aspects in which the Disclosure may be practiced.

The word "exemplary" is used herein to mean "serving as an example, instance, or illustration." Any aspect or design described herein as "exemplary" is not necessarily to be construed as preferred or advantageous over other aspects or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more. The terms "proper subset," "reduced subset," and "lesser subset," refer to a subset of a set that is not equal to the set, i.e. a subset of a set that contains less elements than the set.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB ("Enb"), Home eNodeB, Remote Radio Head ("RRH"), relay point, etc., and may include base stations implemented with conventional base station architectures (e.g. distributed, "all-in-one", etc.) and base stations implemented with centralized base stations architectures (e.g. Cloud Radio Access Network ("Cloud-RAN") or Virtual RAN ("Vran")). As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access ("WiMax") (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced ("LTE-A"), CDMA, WCDMA, LTE-A, General Packet Radio Service ("GPRS"), Enhanced Data Rates for GSM Evolution ("EDGE"), High Speed Packet Access ("HSPA"), HSPA Plus ("HSPA+"), and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network ("RAN") section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

A user device, such as a mobile phone, a computer, a wearable device, or essentially any other device designed to receive and transmit wireless communications over a radio access technology, comprises a protocol stack of various layers, each of which are responsible for the performance of various tasks related to the reception, transmission, or processing of wireless communications. A protocol stack may refer to a group of protocols that run concurrently with one another, and that are employed for the implementation of network protocol suite. The protocols in a stack may determine the rules for interconnectivity for a layered network model. The protocols must be able to connect vertically between the layers of the network. FIG. 1 shows a configuration of a protocol stack 100. The upper levels of the protocol stack 100 comprise a control plane 101 and a user plane 102. The control plane 101 comprises the non-access stratum 103 and the radio resource control 104. The control plane 101 handles radio-specific functionality that depends on the state of the user equipment. The user plane 102 comprises the Transmission Control Protocol ("TCP"), the User Datagram Protocol ("UDP") TCP/UDP 105 and the internet protocol layer 106. The protocol stack further comprises a Packet Data Convergence Protocol ("PDCP") layer 107, which transfers user plane data, transfers control plane data, performs header compression, ciphers, and performs integrity protection. The Radio Link Control ("RLC") 108 layer performs various functions including error correction, segmentation and reassembly, duplicate detection, protocol error detection and recovery, and delivery to upper layers. The Medium Access Control Layer 109 maps between logical channels and transport channels, performs multiplexing, reports scheduling information, performs error correction, performs priority handling through logical channels or with dynamic scheduling, and selects transport formats. The Physical Layer 1010 handles actual signal transmission and reception, including coding and decoding. The Application layer 1011 is a high-level layer that handles data, which may be clear text, encrypted data, or compressed data.

FIG. 2 shows a model for controlling Internet Protocol Packet Bundling in the context of a real-time critical service 200. According to this model, downlink data is received by the receiving device 201. It is then determined whether a real-time critical service is running 202. If there is no real-time critical service, then Internet Protocol Packet Bundling is left enabled 205. If a real-time critical service is running, there are two options for handling the real-time critical service. One option is to disable Internet Protocol Packet Bundling whenever a real-time critical service is running, also referred to throughout herein as Option A 204. Under Option A, whenever a real-time critical service is operating, Internet Protocol Packet Bundling will be disabled 203. Where Option A is not selected, the method will proceed in accordance with Option B. According to Option B, it must be determined whether, under the current Internet Protocol Packet Bundling setting, there is a degradation of the real-time critical service 206. Where there is a degradation of the real-time critical service, the Internet Protocol Packet Bundling can be disabled 203. Where there is no degradation, Internet Protocol Packet Bundling can remain enabled 205.

FIG. 3 shows a table of QCI 300. QCI is a mechanism to help ensure that bearer traffic is allotted an appropriate quality of service, which is a level of traffic prioritization for data transfer. QCI levels range from one through nine, and are assigned various levels of priority. Of particular note, conversation voice transmissions 301 have a QCI of 1; conversational video transmissions 302 have a QCI of 2, and real-time gaming 303 has a QCI of 3.

Figure 4:
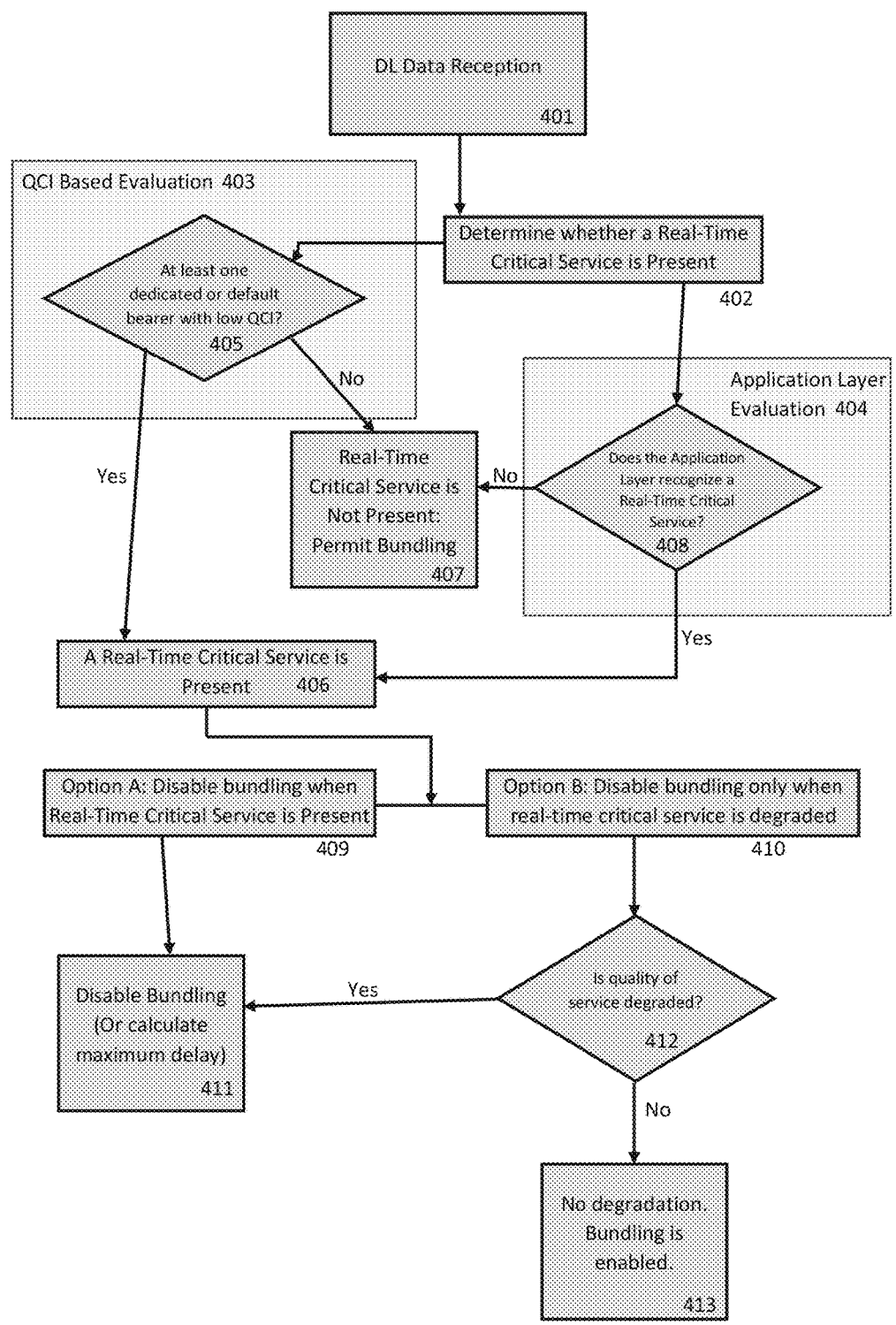
FIG. 4 shows a second flowchart for management of Internet Protocol Packet Bundling.

FIG. 4 shows a more detailed flowchart of a method for managing Internet Protocol Packet Bundling 400, according to an aspect of the Disclosure. According to this method, upon receipt of downlink data 401, it is determined whether a real-time critical service is operating 402. This can be achieved through one of two sub-methods. The first sub-method is with a QCI based evaluation 403, and the second sub-method is with an application layer evaluation 404. Using the QCI based evaluation method, it is determined whether there is at least one dedicated bearer or default bearer with a low QCI value 405. Where there is at least one dedicated bearer or default bearer with a low QCI value, a real-time critical service is present or operating 406. Where there is no dedicated bearer or default bearer with a low QCI value, then no real-time critical service is present or operating 407. Under the application layer evaluation analysis 404, the application layer determines whether a real-time critical service is present or operating 408. Where a real-time critical service is present or operating 406, there are two options for Internet Protocol Packet Bundling. Option A is to disable Internet Protocol Packet Bundling whenever a real-time critical service is present 409. Option B is to only disable Internet Protocol Packet Bundling when both a real-time critical service is present and the real-time critical service experiences degraded quality 410. Under Option A, any detected real-time critical service will result in a decrease or disabling of Internet Protocol Packet Bundling 411. Under Option B, it must be determined whether the real-time critical service is experiencing degraded quality 412. Where the quality is degraded, Internet Protocol Packet Bundling can be decreased or disabled 411. Where it is not degraded, Internet Protocol Packet Bundling can be continued or enabled 413.

Figure 5:
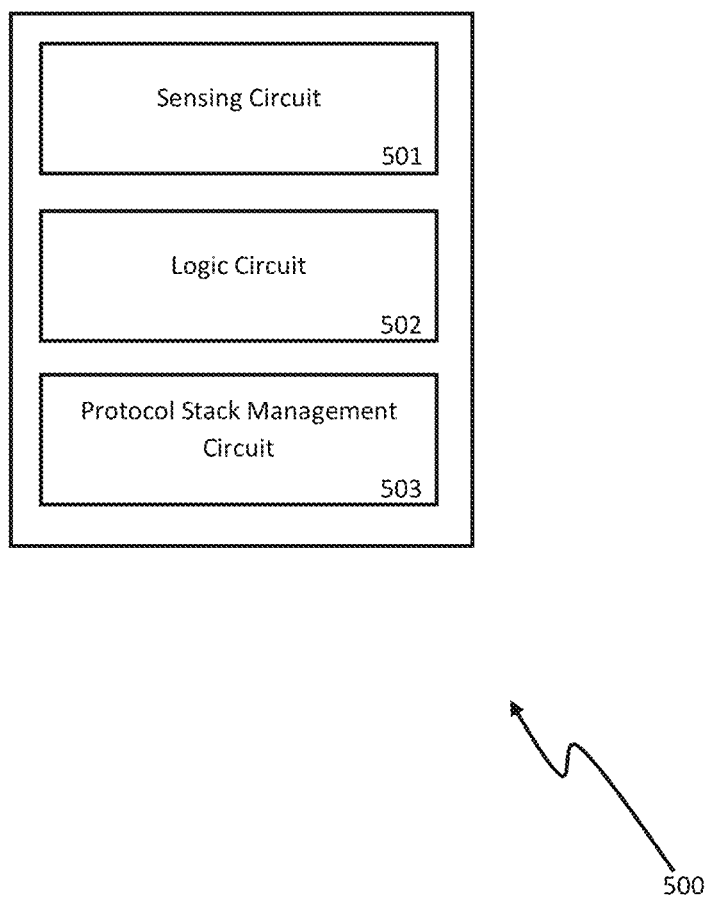
FIG. 5 shows a circuit configuration for management of Internet Protocol Packet Bundling.

FIG. 5 shows a circuit configuration for management of Internet Protocol Packet bundling 500 said circuit configuration comprising a sensing circuit 501, configured to determine an operation of a real-time critical service on a mobile device; a logic circuit 502, configured to determine a data management indicator for the real-time critical service; a protocol stack management circuit 503, configured to determine a maximum number of Internet Protocol Packets for bundled delivery from a first layer of a protocol stack to a second layer of the protocol stack, where a real-time critical service is operating, and based on the data management indicator; wherein the sensing circuit 501 determines whether a real-time critical service is operating; the logic circuit 502 determines a data management indicator for the real-time critical service; a protocol stack management circuit 503 determines a maximum number of Internet Protocol Packets to bundle for bundled delivery from a first layer of a protocol stack to a second layer of the protocol stack, where a real-time critical service is operating, in accordance with the data management indicator; and wherein the protocol stack management circuit 503 receives a number of Internet Protocol Packets totaling the maximum number of Internet Protocol Packets to bundle; bundles the number of Internet Protocol Packets for delivery from a first layer of a protocol stack to a second layer of the protocol stack; and delivers the number of Internet Protocol Packets from the first layer of the protocol stack to the second layer of the protocol stack.

Figure 6:
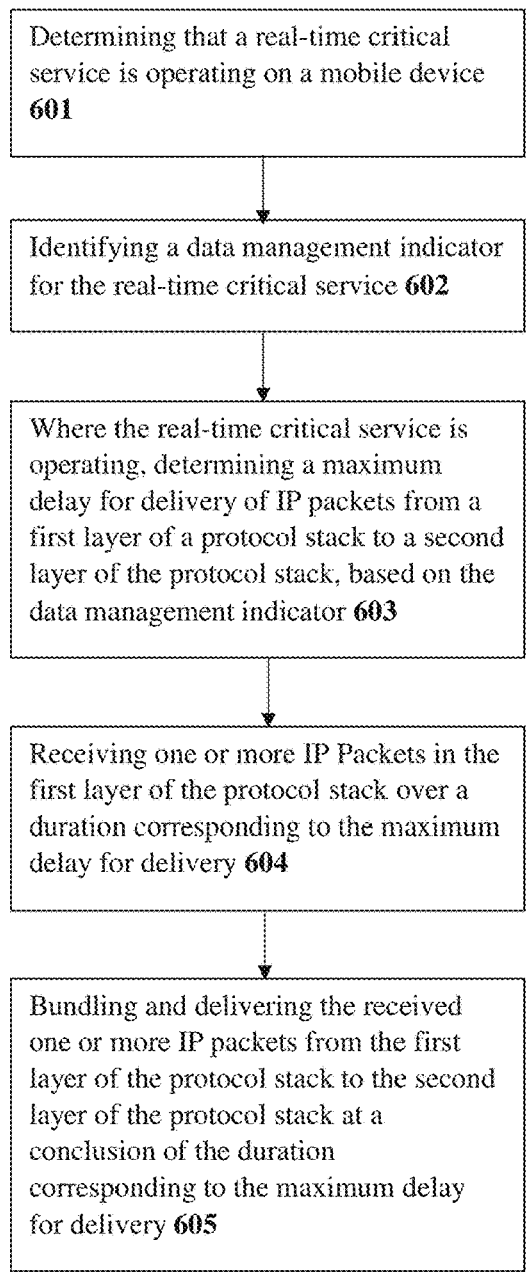
FIG. 6 shows a method for management of Internet Protocol Packet Bundling.

In FIG. 6, a method for managing Internet Protocol Packet bundling 600 is disclosed, said method comprising determining that a real-time critical service is operating on a mobile device 601; identifying a data management indicator for the real-time critical service 602; where the real-time critical service is operating, determining a maximum delay for delivery of Internet Protocol Packets from a first layer of a protocol stack to a second layer of the protocol stack, based on the data management indicator 603; receiving one or more Internet Protocol Packets in the first layer of the protocol stack over a duration corresponding to the maximum delay for delivery 604; and bundling and delivering the received one or more Internet Protocol Packets from the first layer of the protocol stack to the second layer of the protocol stack at a conclusion of the duration corresponding to the maximum delay for delivery 605.

In FIG. 7, a method for managing Internet Protocol Packet bundling 700 is disclosed, said method comprising determining whether a real-time critical service is operating on a mobile device 701; where the real-time critical service is operating, determining a maximum delay for delivery of Internet Protocol Packets from a first layer of a protocol stack to a second layer of the protocol stack 702; receiving one or more Internet Protocol Packets in the first layer of the protocol stack over a duration corresponding to the maximum delay for delivery 703; and bundling and delivering the received one or more Internet Protocol Packets from the first layer of the protocol stack to the second layer of the protocol stack at a conclusion of the duration corresponding to the maximum delay for delivery 704.

The received Internet Protocol Packets may also be Packet Data Convergence Protocol Packet Data Units ("PDCP PDUs") as described in 3GPP TS 36.323, Chapter 5.1.2. Upon receipt of these packets, the LTE PDCP entity determines whether time critical services are running. Such time critical services can be indicated by the application layer or detected by the LTE protocol stack, based on whether an LTE dedicated bearer or default bearer with a low QCI (such as a Quality of Service Class Identifier under 3GPP 23.203, Table 6.1.7) value is established. Where no time critical service is running, Internet Protocol Bundling is enabled, and the received Internet Protocol Packets are bundled and delivered to the application layer every n-th TTI.

Where time critical services are running, however, then there are two options. The first option is to disable Internet Protocol Bundling as long as time critical services are running. The second option is to maintain Internet Protocol Bundling, even where time critical services are running, until such time as the time critical services are degraded. Where the time critical services are degraded, the Internet Protocol Bundling can then be disabled or diminished in frequency. Time critical services can be deemed to be running where at least one dedicated bearer or default bearer with low QoS parameter QCI, such as a QCI of 1 for conversational voice or a QCI of 3 for real time gaming, is present.

Option A, which disables Internet Protocol Packet Bundling whenever a real-time critical service is active, has the benefit that it does not require interfacing with the application layer. Thus, while employing this option, the PDCP can determine whether a real-time critical service is in effect simply by assessing the QCI parameters in use, and without any need to interface with the application layer. This is a simple and efficient method for determining the presence of a real-time critical service. The drawback to this method, however, is that certain real-time critical services may be overlooked.

For instance, conversational voice may not be detected as a real-time critical service when using this method. In LTE, and presumably in future radio access technologies, voice is generally no longer circuit switched, but rather transmitted in data packets, such as in voice over internet protocol ("VoIP") systems. Voice transmitted in digital data packets has a low tolerance for latency or delay, which are disruptive to a conversation and have a high tendency to create user dissatisfaction. However, because of the nature of Internet Protocol Packed-based voice transfer, such conversations may appear to the PDCP as ordinary web traffic, and the PDCP is generally unable to distinguish digitally transmitted voice from low-priority data. As such, reliance on this first option to detect real-time critical services, while organizationally and computationally simple, may result in a failure to recognize digital voice services as being of a high-priority or real-time critical.

A second option to identify a real-time critical service is for the application layer to inform the protocol stack with information about any ongoing real time services. Although the PDCP cannot identify conversational voice services as real-time critical service based on QCI, the application layer can identify and report conversational voice services as real-time critical service.

Once the presence of a real-time critical service is established, whether from QCI or information obtained from the application layer, the Internet Protocol Packet Bundling can be reduced or disabled. According to one aspect of the Disclosure, the presence of a real-time critical service results in a complete disabling of Internet Protocol Packet Bundling. According to a second aspect of the Disclosure, the presence of a real-time critical service results in a diminishment or reduction in Internet Protocol Packet Bundling. Whether a disablement or diminishment of Internet Protocol Packet Bundling, this can be achieved by setting a maximum number of Internet Protocol Packets to bundle. Where the maximum number of Internet Protocol Packets to bundle is less than two, Internet Protocol Packet Bundling is effectively disabled. Where the maximum number of Internet Protocol Packets to bundle is two or greater, Internet Protocol Packet Bundling is effectively enabled. A high number of maximum Internet Protocol Packets to bundle results in less frequent transfers of Internet Protocol Packets to the upper layers but may result in power savings. A low number of maximum Internet Protocol Packets to bundle results in more frequent transfers of Internet Protocol Packets to the upper layers but may result in greater power demand.

Because Internet Protocol Packet Bundling remains an established power-saving method, it must be determined when to increase or reinstate Internet Protocol Packet Bundling, in the event that it has been diminished or discontinued. According to one aspect of the Disclosure, the diminishment or discontinuation of Internet Protocol Packet Bundling should be maintained as long as the real-time critical service is operational. Once the real-time critical service is complete, the Internet Protocol Packet Bundling can be returned to pre-real-time critical service functionality.

According to a second aspect of the Disclosure, the Internet Protocol Packet Bundling can be periodically reevaluated during the performance of the real-time critical service. As detailed above, where a real-time critical service is present, the Internet Protocol Packet Bundling may be diminished or discontinued. Many real-time critical services, such as conversational voice calls, streaming video, and gaming, are anticipated to continue for extended lengths of time, potentially several seconds, minutes, or hours. Whatever the length, it is anticipated that, although a real-time critical service may be very brief, it may also be comparatively great in duration, and may last greatly in excess of one or many TTIs. As such, the reduction or elimination of Internet Protocol Packet Bundling during a real-time critical service can be reevaluated periodically to ensure appropriate use of Internet Protocol Packet Bundling in light of a currently-running real-time critical service. Where Internet Protocol Packet Bundling has been discontinued due to a real-time critical service, the Internet Protocol Packet Bundling can be periodically re-evaluated during the real-time critical service. Upon period re-evaluation, the real-time critical service can remain discontinued, can be restored to pre-real-time critical service levels, or can be increased somewhat, but not returned entirely to pre-real-time critical service levels. Such an increase would be due to an ongoing real-time critical service where the quality of the real-time critical service is not significantly diminished by Internet Protocol Bundling and/or where it is determined that an increase in Internet Protocol Packet Bundling can be tolerated without an unacceptable decrease in the quality of a real-time critical service. Where a re-evaluation is performed, and it is determined that a real-time critical service has been completed or terminated, but where other real-time critical services are still operating, the Internet Protocol Packet Bundling can be increased or restored. Where a re-evaluation is performed, and it is determined that no real-time critical services are in operation, the Internet Protocol Packet Bundling can be restored to previous levels.

According to an additional aspect of the Disclosure, periodic review of the Internet Protocol Packet Bundling can be performed with an examination of the QCI. Where the QCI suggests the operation of a real-time critical service, Internet Protocol Packet Bundling can remain diminished or disabled. Where fewer real-time critical services are operating compared to the prior evaluation, Internet Protocol Packet Bundling can be increased or restored. Where QCI indicates that no real-time critical service is operating, then Internet Protocol Packet Bundling can be restored.

According to an additional aspect of the Disclosure, Internet Protocol Packet Bundling results in the bundling of received Internet Protocol Packets, such that they are not delivered to higher layers upon complete receipt in sequence, as may otherwise occur, but rather are delivered every n TTIs, where n is an integer greater than one. For example, Internet Protocol Packets can be bundled together and delivered to the higher layers every n=4 TTIs. This results in one transfer to the higher level every four TTIs, rather than a transfer every TTI, which can result in a 75% reduction in power for transfer of Internet Protocol Packets.

The method of Internet Protocol Packet Management may require determination of a data management indicator for the real-time critical service. The data management indicator is especially relevant for aspects of the Disclosure where reduction or discontinuation of Internet Protocol Packet Bundling is dependent on both the presence of a real-time critical service and a decrease in quality of service of the real-time critical service. In such circumstances, the data management indicator represents the quality of the real-time critical service, and especially whether the quality of the real-time critical service is suffering from, or could be improved by, a reduction in Internet Protocol Packet Bundling. Thus, once the mobile device establishes the operation of a real-time critical service, the mobile device must then assess a data management indicator by determining whether the real-time critical service is degraded. This can be achieved by assessing data error rates or bit rates for the real-time critical service, or through any known method for assessing error. According to one aspect of the disclosure, where the data management indicator evidences that the real-time critical service is degraded, the mobile device can reduce the Internet Protocol Packet Bundling. According to another aspect of the disclosure, where the data management indicator evidences degradation of a real-time critical service, the mobile device may perform the additional step of determining a likelihood of whether a change in Internet Protocol Packet Bundling would be likely to result in a change in the service degradation. For example, where degradation results from factors unrelated to Internet Protocol Packet Bundling, such as network unavailability, a change in Internet Protocol Packet Bundling may be unlikely to improve the service degradation.

A non-exclusive list of real-time critical services comprises Voice over Internet Protocol, Voice over LTE, Voice over 5G, Internet Protocol Packet based conversational voice services, real-time gaming, and non-buffered video. Furthermore, a real-time critical service may include any service for which performance of said service can be degraded by Internet Protocol Packet Bundling.

As described above, Internet Protocol Packet Bundling results in the combination of n Internet Protocol Packets for delivery to an upper layer, where n represents the number of Internet Protocol Packets to be bundled together and is an integer of two or greater. Where n=1, the number of Internet Protocol Packets to be bundled is one, which is effectively an elimination of Internet Protocol Packet Bundling. Where n is 0, the number of Internet Protocol Packets to be bundled is zero, which is also effectively an elimination of Internet Protocol Packet Bundling. It is anticipated that where n is an integer and n≤2, Internet Protocol Packet Bundling is effectively disabled. Where n is an integer two or greater, Internet Protocol Packet Bundling is enabled, where higher values of n result in greater amounts of Internet Protocol Packets being bundled together for transmission to the higher levels.

According to one aspect of the Disclosure, the Application layer may determine the existence of a real-time critical service and inform any of the remaining layers that a real-time critical service is in operation. The Application layer may be able to identify operation of real-time critical services that may otherwise be undetected by observing QCI data. For example, voice data may be transmitted in Internet Protocol Packets, such as in a Voice over Internet Protocol scenario, which may appear to the lower layers as routine, low-priority web traffic. The application layer, however, can identify Internet Protocol Packet data voice calls as a real-time critical service. Under this circumstance, the application layer can inform the lower layers that a data stream is in fact voice data, rather than routine web data; that it is a real-time critical service; and that it should receive a higher traffic priority. In this case, the Application layer can inform PDCP of the existence of a real-time critical service, particularly a real-time critical service that PDCP could not have itself identified. This identification in the Application layer, which is then passed on to PDCP, permits the creation of a data management indicator for conversational voice services that are routed over a default bearer.

According to an additional aspect of the Disclosure, the Application layer can determine whether the performance of a real-time critical service is degraded by Internet Protocol Packet Bundling. Because Internet Protocol Packet Bundling results in less frequent delivery of Internet Protocol Packets to the higher levels, latency intolerant services, such as real-time critical services, may suffer a degradation in quality from Internet Protocol Packet Bundling. The Application layer may assess the quality of the real-time critical service, determine whether the real-time critical service would benefit from a reduction in Internet Protocol Packet Bundling, and/or adjust the data management indicator accordingly. For example, where a real-time critical service is operating, but there is no degradation of the real-time critical service, the Application layer may inform the other layers that a real-time critical service is running, but the Application layer may set the data management indicator such that there is no change in Internet Protocol Packet Bundling. Where a running real-time critical service suffers from a predetermined level of degradation, the Application layer may adjust the data management indicator to decrease or cease altogether Internet Protocol Packet Bundling.

Internet Protocol Packet Bundling comprises grouping a plurality of Internet Protocol Packets for delivery to a higher layer. The term Internet Protocol Packets is used generally to describe a data packet. This may be a packet that is received in a wireless transmission to be processed. Alternatively, this may be a packet from an application, routine, or sub-routine, and which is processed for a wireless transmission. An Internet Protocol Packet may be a network packet, generally. An Internet Protocol Packet may be a protocol data unit, whether generally or colloquially known as such, or in accordance with the Packet Data Convergence Protocol. Where additional Radio Access Technologies use other terms, the use of Internet Protocol Packet is not meant to be exclusive. Rather, it is anticipated that this Disclosure may be applied to future Radio Access Technologies. It is also expressly anticipated that this Disclosure can be applied to any kind of information packet that is subject to bundling for transmission to a higher layer.

Where one or more real-time critical services are identified, the data management indicator can be set to alter the frequency of Internet Protocol Packet Bundling. This may result in a temporary reduction in frequency of Internet Protocol Packet Bundling, or a temporary discontinuation of Internet Protocol Packet Bundling. According to one aspect of the Disclosure, the data management indicator can be set to reduce or discontinue Internet Protocol Packet Bundling whenever a real-time critical service is operating. According to a second aspect of the disclosure, the Internet Protocol Packet Bundling can be set to reduce or discontinue Internet Protocol Packet Bundling whenever a real-time critical service is operating and experiences a degradation in quality. The Application layer may set the data management indicator. Alternatively, the data management indicator may be set by the network, the user, or another layer.

According to an additional aspect of the Disclosure, a real-time critical service can be determined to be operating wherein at least one dedicated bearer or default bearer is operating with a QCI of 1. This QCI threshold may alternatively be set for a number greater than one. For example, and according to an aspect of the Disclosure, a real-time critical service can be said to be wherein at least one dedicated bearer or default bearer is operating with operating with a QCI≤2, or wherein at least one dedicated bearer or default bearer is operating with a QCI≤3. The data management indicator may be configured as an indication of a low QCI, or configure to reduce or discontinue Internet Protocol Packet Bundling whenever an application with a low QCI is operating. According to one aspect of the Disclosure, a real-time critical service being any service that experiences a degradation from Internet Protocol Packet bundling.

The QCI for conversational voice may be 1, which represents the need to have high priority data traffic and uninterrupted service for conversational voice. This represents the low latency tolerance of conversational voice, whereby disruptions in data transmissions may result in pausing, hanging, jittering, disconnection, or other user-perceivable interruptions that are closely correlated with user dissatisfaction. Internet Protocol Packet-based voice services, regardless of QCI, are real-time critical services that are expected to be especially susceptible to delay created by Internet Protocol Packet Bundling.

The QCI for real time gaming may be 3. This represents real-time gaming's low latency tolerance and its susceptibility to unacceptable, user-perceivable interruptions from delays in data delivery. Such delays may result in pausing, hanging, jittering, disconnection, or other user-perceivable interruptions.

According to one aspect of the Disclosure, the data management indicator may be set based on a maximum number of Internet Protocol Packets for bundled delivery from a first layer of a protocol stack to a second layer of the protocol stack. This calculation can be performed by any layer in the protocol stack. It is contemplated that the Application layer is one layer within the protocol stack that is capable of reaching this determination.

The setting of the data management indicator may require the determination of a level of degradation of a real-time critical service. Thus, where a real-time critical service is operational, and where the data management indicator is to be set, it may be necessary to determine a level of degradation of the real-time critical service. This may require an assessment of the service's performance, with respect to factors comprising stability, reliability, latency, jitter, and user experience. The results of any one or any combination of these assessments can be used to determine a severity of degradation, and subsequently to determine a corresponding setting for the data management indicator, such that the Internet Protocol Packet Bundling is appropriately diminished or prohibited. This assessment can be performed by any aspect of the protocol stack. It is particularly contemplated that this assessment can be performed by the application layer. The data management indicator can be set to reduce or discontinue the Internet Protocol Packet Bundling when a real-time critical service is degraded. Similarly, the data management indicator can be set to increase or restore Internet Protocol Packet Bundling when the degradation of the real-time critical service improves. According to one aspect of the Disclosure, Internet Protocol Packet Bundling can be prohibited only where a degradation of the real-time critical service is present. As an extension of this idea, and according to an additional aspect of the Disclosure, the data management indicator can be set to increase Internet Protocol Bundling only where degradation of a Real-Time Critical Service improves.

Where Internet Protocol Packet Bundling is disabled, a first layer of the protocol stack will deliver an Internet Protocol Packet from the first layer of the protocol stack to the second layer of the protocol stack on a TTI immediately after a TTI when the first protocol stack received the Internet Protocol Packet. In essence, received Internet Protocol Packets will be delivered on the first TTI available after complete reception.

According to one aspect of the Disclosure, this method may be performed by a circuit configuration for managing Internet Protocol Packet bundling. In this case, said circuit configuration may comprise a sensing circuit, configured to determine an operation of a real-time critical service on a mobile device; a logic circuit, configured to determine a data management indicator for the real-time critical service; a protocol stack management circuit, configured to determine a maximum number of Internet Protocol Packets for bundled delivery from a first layer of a protocol stack to a second layer of the protocol stack, where a real-time critical service is operating, and based on the data management indicator; wherein the sensing circuit determines whether a real-time critical service is operating on a mobile device; the logic circuit determines a data management indicator for the real-time critical service; a protocol stack management circuit determines a maximum number of Internet Protocol Packets to bundle for bundled delivery from a first layer of a protocol stack to a second layer of the protocol stack, where a real-time critical service is operating, in accordance with the data management indicator; and wherein the protocol stack management circuit receives a number of Internet Protocol Packets totaling the maximum number of Internet Protocol Packets to bundle; bundles the number of Internet Protocol Packets for delivery from a first layer of a protocol stack to a second layer of the protocol stack; and delivers the number of Internet Protocol Packets from the first layer of the protocol stack to the second layer of the protocol stack.

According to one aspect of the Disclosure, this circuit configuration may be presented in a plurality of devices, which may themselves be configured for wireless communication. This circuit configuration may be found within a mobile communication device, such as a mobile phone, a smart phone, a tablet computer, laptop computer configured for wireless communication, or a desktop computer configured for wireless communication. The circuit configuration may be present in a wearable device configured for wireless connectivity, where said wearable device may comprise, but is not limited to, wristbands, armbands, wearable sensors, clothing, necklaces, headbands, or otherwise. The circuit configuration may also be present in a motor vehicle, a home appliance, a home defense system, a home management system, or a home surveillance system.

According to an aspect of the Disclosure, this method may be intended for use with radio communication technologies, including, but not limited to, devices in connection with a radio access technology for at least the reception of wireless communication.

According to one aspect of the Disclosure, there is disclosed a means for management of Internet Protocol Packet bundling. Said means determines that a real-time critical service is operating on a mobile device, which may be achieved with at least two methods. First, the means may assess the QCI for any operating applications. The means may be programmed to determine the presence of a real-time critical service when the QCI is equal to or less than a predetermined number. For example, the means may determine that a QCI≤3 indicates a real-time critical service. Alternatively, the application layer of the mobile device may determine the presence of a real-time critical service. Reliance on the application layer for this determination may provide a benefit where a Voice over Internet Protocol operation is running, as Voice over Internet Protocol is real-time critical but may appear to the lower layers as routine web data, and therefore may not be recognized as a real-time critical service based solely on assessment of QCI. Where an operation of a real-time critical service is determined, the means determines a data management indicator for the real-time critical service. As described herein, the data management indicator is a reflection of the function of a real-time critical service, and specifically whether the real-time critical service is degraded. Where the real-time critical service is operating, and based on the data management indicator, the means determines a maximum delay for delivery of Internet Protocol Packets from a first layer of a protocol stack to a second layer of the protocol stack. The means may disable or reduce Internet Protocol Packet Bundling. The change in Internet Protocol Packet Bundling may be triggered from any presence of a real-time critical service, or from any degradation of a real-time critical service, or from a degradation of a real-time critical service past a threshold. Where a change in Internet Protocol Packet Bundling is indicated, the means initiates said change by determining a maximum delay for delivery of Internet Protocol Packets. The means receives a number of Internet Protocol Packets in the first layer of the protocol stack over a period of time corresponding to the maximum delay for delivery and bundles and delivers the Internet Protocol Packets from the first layer of a protocol stack to the second layer of the protocol stack at a conclusion of the period of time corresponding to the maximum delay for delivery.

In Example 1, a method for managing Internet Protocol Packet bundling is disclosed, said method comprising:
determining that a real-time critical service is operating on a mobile device;
identifying a data management indicator for the real-time critical service;
where the real-time critical service is operating, determining a maximum delay for delivery of Internet Protocol Packets from a first layer of a protocol stack to a second layer of the protocol stack, based on the data management indicator;
receiving one or more Internet Protocol Packets in the first layer of the protocol stack over a duration corresponding to the maximum delay for delivery; and
bundling and delivering the received one or more Internet Protocol Packets from the first layer of the protocol stack to the second layer of the protocol stack at a conclusion of the duration corresponding to the maximum delay for delivery.

In Example 2, a method for managing Internet Protocol Packet bundling, said method comprising:
determining whether a real-time critical service is operating on a mobile device;
where the real-time critical service is operating, determining a maximum delay for delivery of Internet Protocol Packets from a first layer of a protocol stack to a second layer of the protocol stack;
receiving one or more Internet Protocol Packets in the first layer of the protocol stack over a duration corresponding to the maximum delay for delivery; and
bundling and delivering the received one or more Internet Protocol Packets from the first layer of the protocol stack to the second layer of the protocol stack at a conclusion of the duration corresponding to the maximum delay for delivery.

In Example 3, the method of any one of examples 1 or 2, further comprising Voice over Internet Protocol being a real-time critical service.

In Example 4, the method of any one of examples 1 or 2, further comprising Voice over LTE being a real-time critical service.

In Example 5, the method of any one of examples 1 or 2, further comprising Voice over 5G being a real-time critical service.

In Example 6, the method of any one of examples 1 or 2, further comprising real-time gaming being a real-time critical service.

In Example 7, the method of any one of examples 1 or 2, further comprising non-buffered video being a real-time critical service.

In Example 8, the method of any one of examples 1 through 7, further comprising the maximum delay for delivery of Internet Protocol Packets being a number of transmission time intervals.

In Example 9, the method of example 8, further comprising the number of transmission time intervals being zero.

In Example 10, the method of example 8, further comprising the number of transmission time intervals being one.

In Example 11, the method of example 8, further comprising the number of transmission time intervals being four.

In Example 12, the method of example 8, further comprising the number of transmission time intervals being an integer from zero to 16.

In Example 13, the method of any one of examples 1 through 12, further comprising an application layer setting the data management indicator to discontinue Internet Protocol Packet bundling.

In Example 14, the method of any one of examples 1 through 13, further comprising an application layer setting the data management indicator to reduce the maximum delay for delivery of Internet Protocol Packets.

In Example 15, the method of any one of examples 1 through 13, further comprising an application layer setting the data management indicator to increase the maximum delay for delivery of Internet Protocol Packets.

In Example 16, the method of any one of examples 1 through 15, further comprising the Internet Protocol Packet being a protocol data unit.

In Example 17, the method of example 16, further comprising the Protocol Data Unit being a Protocol Data Unit according to a Packet Data Convergence Protocol.

In Example 18, the method of any one of examples 1 through 14 or 16 through 17, further comprising setting the data management indicator to reduce the maximum delay for delivery of Internet Protocol Packets whenever a real-time critical service is operating.

In Example 19, the method of any one of examples 1 through 14 or 16 through 18, further comprising setting the data management indicator to set the maximum delay for delivery of Internet Protocol Packets to zero whenever a real-time critical service is operating.

In Example 20, the method of any one of examples 1 through 14 or 16 through 18, further comprising setting the data management indicator to discontinue Internet Protocol Bundling whenever a real-time critical service is operating.

In Example 21, the method of any one of examples 1 through 20, further comprising determining a real-time critical service to be operating wherein at least one dedicated bearer or default bearer is operating with a Quality of Service Class Identifier of 1.

In Example 22, the method of any one of examples 1 through 20, further comprising determining a real-time critical service to be operating wherein at least one dedicated bearer or default bearer is operating with a Quality of Service Class Identifier of 2.

In Example 23, the method of any one of examples 1 through 20, further comprising determining a real-time critical service to be operating wherein at least one dedicated bearer or default bearer is operating with a Quality of Service Class Identifier of 3.

In Example 24, the method of any one of examples 1 through 20, further comprising determining a real-time critical service to be operating wherein at least one dedicated bearer or default bearer is operating with a Quality of Service Class Identifier of 1, 2, or 3.

In Example 25, the method of any one of examples 1 through 20, further comprising determining a real-time critical service to not be operating wherein all Quality of Service Class Identifiers are greater than 3.

In Example 26, the method of any one of examples 1 through 25, further comprising determining a real-time critical service to be operating due to a low QoS Class Identifier value.

In Example 27, the method of any one of examples 26, wherein the low QoS Class Identifier value is a value of 1 for conversational voice.

In Example 28, the method of any one of examples 26, wherein the low QoS Class Identifier value is a value of 2 for conversational video.

In Example 29, the method of any one of examples 26, wherein the low QoS Class Identifier value is a value of 3 for real time gaming.

In Example 30, the method of any one of examples 1 through 29, wherein a layer within a protocol stack determines whether a real-time critical service is in operation.

In Example 31, the method of any one of examples 1 through 29, wherein an Application layer within a protocol stack determines whether a real-time critical service is in operation.

In Example 32, the method of any one of examples 1 through 29, wherein an Application layer within a protocol stack determines a real-time critical service to be operating on the mobile device.

In Example 33, the method of example 32, further comprising the Application layer determining the data management indicator for the real-time critical service.

In Example 34, the method of any one of examples 1 through 33, further comprising Internet Protocol Packet-based voice communications being a real-time critical service.

In Example 35, the method of example 34, further comprising an Application layer determining that Internet Protocol Packet-based voice communications is a real-time critical service.

In Example 36, the method of any one of examples 1 and 3 through 35, further comprising determining a level of degradation of the real-time critical service.

In Example 37, the method of example 36, further comprising setting the data management indicator based the level of degradation of the real-time critical service.

In Example 38, the method of example 36 or 37, further comprising setting the data management indicator to discontinue Internet Protocol Bundling because of degradation of the real-time critical service.

In Example 39, the method of example 36 or 37, further comprising setting the data management indicator to reduce Internet Protocol Bundling because of degradation of the real-time critical service.

In Example 40, the method of any one of examples 36 or 37, further comprising setting the data management indicator to increase Internet Protocol Bundling when the degradation of the real-time critical service improves.

In Example 41, the method of any one of examples 36 or 37, further comprising setting the data management indicator to restore Internet Protocol Bundling when the degradation of the real-time critical service resolves.

In Example 42, the method of any one of examples 1 and 3 through 41, further comprising a real-time critical service being any service that experiences a degradation from Internet Protocol Packet bundling.

In Example 43, the method of any one of examples 1 or 3 through 42, further comprising the data management indicator precluding Internet Protocol Packet bundling only when time-critical services are degraded.

In Example 44, the method of any one of examples 1 or 3 through 43, wherein an Application layer determines the data management indicator based on a degradation of a Real-Time Critical Service.

In Example 45, the method of any one of examples 1 or 3 through 44, further comprising setting the data management indicator to reduce Internet Protocol Bundling only where a Real-Time Critical Service experiences degradation.

In Example 46, the method of any one of examples 1 or 3 through 44, further comprising setting the data management indicator to increase Internet Protocol Bundling where degradation of a Real-Time Critical Service improves.

In Example 47, the method of any one of examples 1 through 46, further disclosing a layer of a protocol stack determining a degradation of a real-time critical service and setting a data management indicator because of the degradation of a real-time critical service.

In Example 48, the method of any one of examples 1 through 47, further comprising, for each Internet Protocol Packet received, delivering the Internet Protocol Packet from the first layer of the protocol stack to the second layer of the protocol stack on a transmission time interval immediately after a transmission time interval when the first layer of the protocol stack received the Internet Protocol Packet.

In Example 49, the method of any one of examples 1 through 47, further comprising, for each Internet Protocol Packet received, delivering the Internet Protocol Packet from the first layer of the protocol stack to the second layer of the protocol stack on a transmission time interval immediately after a transmission time interval when the first layer of the protocol stack received the Internet Protocol Packet, based on the operation of a real-time critical service.

In Example 50, the method of any one of examples 1 through 47, further comprising, for each Internet Protocol Packet received, delivering the Internet Protocol Packet from the first layer of the protocol stack to the second layer of the protocol stack on a transmission time interval immediately after a transmission time interval when the first layer of the protocol stack received the Internet Protocol Packet, based on the operation of a data management indicator.

In Example 51, the method of any one of examples 1 through 50, further comprising an application layer determining whether a real-time critical service is operating and informing a Packet Data Convergence Protocol of the determination.

In Example 52, the method of example 51, further comprising the Packet Data Convergence Protocol setting the data management indicator for conversational voice services that are routed over a default bearer using the determination received from an application layer.

In Example 53, the method of any one of examples 1 to 52, further comprising delivering an Internet Protocol Packet from the first layer of the protocol stack to the second layer of the protocol stack on a transmission time interval immediately after reception of the Internet Protocol Packet, whenever the maximum delay for delivery of the Internet Protocol Packets is zero.

In Example 54, an apparatus comprising means to perform a method as described in any preceding example.

In Example 55, a circuit configuration for managing Internet Protocol Packet bundling, said circuit configuration comprising:
a sensing circuit configured to determine that a real-time critical service is operating on a mobile device;
a logic circuit configured to identify a data management indicator for the real-time critical service;
a protocol stack management circuit configured to determine a maximum delay for delivery of Internet Protocol Packets from a first layer of a protocol stack to a second layer of the protocol stack, where the real-time critical service is operating, and based on the data management indicator;
wherein:
the protocol stack management circuit receives in the first layer of the protocol stack a number of Internet Protocol Packets during a period equaling the maximum delay for delivery of Internet Protocol Packets from a first layer of a protocol stack to a second layer of the protocol stack; and bundles and delivers the Internet Protocol Packets from the first layer of a protocol stack to the second layer of the protocol stack at a conclusion of the period equaling the maximum delay for delivery.

In Example 56, the circuit configuration of example 55, further comprising the circuit configuration being present in a mobile communication device.

In Example 57, the circuit configuration of example 55, further comprising the circuit configuration being present in a desktop computer, laptop computer, tablet computer, or smartphone.

In Example 58, the circuit configuration of example 55, further comprising the circuit configuration being present in a wearable device configured for wireless connectivity.

In Example 59, the circuit configuration of example 55, further comprising the circuit configuration being present in a motor vehicle.

In Example 60, the circuit configuration of example 55, further comprising the circuit configuration being present in a home appliance, a home defense system, a home management system, or a home surveillance system.

In Example 61, a means for management of Internet Protocol Packet bundling, wherein said means:
determines that a real-time critical service is operating on a mobile device;
determines a data management indicator for the real-time critical service;
where the real-time critical service is operating, and based on the data management indicator, determines a maximum delay for delivery of Internet Protocol Packets from a first layer of a protocol stack to a second layer of the protocol stack;
receives a number of Internet Protocol Packets in the first layer of the protocol stack over a period of time corresponding to the maximum delay for delivery; and bundles and delivers the Internet Protocol Packets from the first layer of a protocol stack to the second layer of the protocol stack at a conclusion of the period of time corresponding to the maximum delay for delivery.

In Example 62, a means for management of Internet Protocol Packet bundling, wherein said means:
determines whether a real-time critical service is operating on a mobile device;
where the real-time critical service is operating, determines a maximum delay for delivery of Internet Protocol Packets from a first layer of a protocol stack to a second layer of the protocol stack;
receives a number of Internet Protocol Packets in the first layer of the protocol stack over a period of time corresponding to the maximum delay for delivery; and bundles and delivers the Internet Protocol Packets from the first layer of a protocol stack to the second layer of the protocol stack at a conclusion of the period of time corresponding to the maximum delay for delivery.

In Example 63, a non-transient computer readable medium containing program instructions for causing a computer to perform In Example 1, the method of:
determining whether a real-time critical service is operating on a mobile device;
determining a data management indicator for the real-time critical service;
where the real-time critical service is operating, and based on the data management indicator, determining a maximum delay for delivery of Internet Protocol Packets from a first layer of a protocol stack to a second layer of the protocol stack;
receiving a number of Internet Protocol Packets in the first layer of the protocol stack over a period of time corresponding to the maximum delay for delivery; and
bundling and delivering the Internet Protocol Packets from the first layer of a protocol stack to the second layer of the protocol stack at a conclusion of the period of time corresponding to the maximum delay for delivery.

In Example 64, a non-transient computer readable medium containing program instructions for causing a computer to perform In Example 1, the method of:
determining whether a real-time critical service is operating on a mobile device;
where the real-time critical service is operating, determining a maximum delay for delivery of Internet Protocol Packets from a first layer of a protocol stack to a second layer of the protocol stack;
receiving a number of Internet Protocol Packets in the first layer of the protocol stack over a period of time corresponding to the maximum delay for delivery; and
bundling and delivering the Internet Protocol Packets from the first layer of a protocol stack to the second layer of the protocol stack at a conclusion of the period of time corresponding to the maximum delay for delivery.

In Example 65, a machine-readable medium including code, when executed, to cause a machine to perform In Example 1, the method of any one of examples 1 through 60.

In Example 66, a method for managing Internet Protocol Packet bundling, said method comprising:
determining whether a real-time critical service is operating on a mobile device;
determining a data management indicator for the real-time critical service;
where the real-time critical service is operating, and based on the data management indicator, determining a maximum number of Internet Protocol Packets for bundled delivery from a first layer of a protocol stack to a second layer of the protocol stack;
receiving in the first layer of the protocol stack a number of Internet Protocol Packets totaling the maximum number of Internet Protocol Packets for bundled delivery;
where the maximum number of Internet Protocol Packets for bundled delivery is greater than one, bundling the maximum number of Internet Protocol Packets for bundled delivery, and delivering the bundled maximum number of Internet Protocol Packets for bundled delivery from the first layer of the protocol stack to the second layer of the protocol stack; and where the maximum number of Internet Protocol Packets for bundled delivery is less than two, delivering Internet Protocol Packets received by the first layer of the protocol stack on a first transmission time interval to the second layer of the protocol stack on a second transmission time interval occurring immediately following the first transmission time interval.

In Example 67, a method for managing Internet Protocol Packet bundling, said method comprising:
determining whether a real-time critical service is operating on a mobile device;
where the real-time critical service is operating, determining a maximum number of Internet Protocol Packets for bundled delivery from a first layer of a protocol stack to a second layer of the protocol stack;
receiving in the first layer of the protocol stack a number of Internet Protocol Packets totaling the maximum number of Internet Protocol Packets for bundled delivery;
where the maximum number of Internet Protocol Packets for bundled delivery is greater than one, bundling the maximum number of Internet Protocol Packets for bundled delivery, and delivering the bundled maximum number of Internet Protocol Packets for bundled delivery from the first layer of the protocol stack to the second layer of the protocol stack; and
where the maximum number of Internet Protocol Packets for bundled delivery is less than two, delivering Internet Protocol Packets received by the first layer of the protocol stack on a first transmission time interval to the second layer of the protocol stack on a second transmission time interval occurring immediately following the first transmission time interval.

In Example 68, the method of any one of examples 66 or 67, further comprising Voice over Internet Protocol being a real-time critical service.

In Example 69, the method of any one of examples 65 or 66, further comprising Voice over LTE being a real-time critical service.

In Example 70, the method of any one of examples 65 or 66, further comprising Voice over 5G being a real-time critical service.

In Example 71, the method of any one of examples 65 or 66, further comprising real-time gaming being a real-time critical service.

In Example 72, the method of any one of examples 65 or 66, further comprising non-buffered video being a real-time critical service.

In Example 73, the method of any one of examples 65 through 72, wherein the maximum number of Internet Protocol Packets to bundle is one.

In Example 74, the method of any one of examples 65 through 72, wherein the maximum number of Internet Protocol Packets to bundle is zero.

In Example 75, the method of any one of examples 65 through 72, wherein the maximum number of Internet Protocol Packets to bundle is less than two.

In Example 76, the method of any one of examples 65 through 75, further comprising an application layer setting the data management indicator to discontinue Internet Protocol Packet bundling.

In Example 77, the method of any one of examples 65 through 76, further comprising an application layer setting the data management indicator to reduce Internet Protocol Packet bundling.

In Example 78, the method of any one of examples 65 through 77, further comprising the Internet Protocol Packet being a protocol data unit.

In Example 79, the method of example 78, further comprising the Protocol Data Unit being a Protocol Data Unit according to a Packet Data Convergence Protocol.

In Example 80, the method of any one of examples 65 through 79, further comprising setting the data management indicator to reduce the maximum number of Internet Protocol Packets for bundled delivery whenever a real-time critical service is operating.

In Example 81, the method of any one of examples 65 through 80, further comprising setting the data management indicator to discontinue Internet Protocol Bundling whenever a real-time critical service is operating.

In Example 82, the method of any one of examples 65 through 81, further comprising setting the maximum number of Internet Protocol Packets for bundled delivery to one when a real-time critical service is operating.

In Example 83, the method of any one of examples 65 through 82, further comprising setting the maximum number of Internet Protocol Packets for bundled delivery to zero when a real-time critical service is operating.

In Example 84, the method of any one of examples 65 through 83, further comprising setting the maximum number of Internet Protocol Packets for bundled delivery to an integer less than 2, when a real-time critical service is operating.

In Example 85, the method of any one of examples 65 through 84, further comprising determining a real-time critical service to be operating wherein at least one dedicated bearer or default bearer is operating with a Quality of Service Class Identifier of 1.

In Example 86, the method of any one of examples 65 through 84, further comprising determining a real-time critical service to be operating wherein at least one dedicated bearer or default bearer is operating with a Quality of Service Class Identifier of 2.

In Example 87, the method of any one of examples 65 through 84, further comprising determining a real-time critical service to be operating wherein at least one dedicated bearer or default bearer is operating with a Quality of Service Class Identifier of 3.

In Example 88, the method of any one of examples 65 through 84, further comprising determining a real-time critical service to be operating wherein at least one dedicated bearer or default bearer is operating with a Quality of Service Class Identifier of 1, 2, or 3.

In Example 89, the method of any one of examples 65 through 88, further comprising determining a real-time critical service to not be operating wherein all Quality of Service Class Identifiers are greater than 3.

In Example 90, the method of any one of examples 65 through 89, further comprising determining a real-time critical service to be operating due to a low QoS Class Identifier value.

In Example 91, the method of example 90, wherein the low QoS Class Identifier value is a value of 1 for conversational voice.

In Example 92, the method of example 90, wherein the low QoS Class Identifier value is a value of 2 for conversational video.

In Example 93, the method of example 90, wherein the low QoS Class Identifier value is a value of 3 for real time gaming.

In Example 94, the method of any one of examples 65 through 93, wherein a layer within a protocol stack determines whether a real-time critical service is in operation.

In Example 95, the method of any one of examples 65 through 94, wherein an Application layer within a protocol stack determines whether a real-time critical service is in operation.

In Example 96, the method of any one of examples 65 through 95, wherein an Application layer within a protocol stack determines a real-time critical service to be operating on the mobile device.

In Example 97, the method of any one of examples 65 through 96, further comprising an Application layer determining the data management indicator for the real-time critical service.

In Example 98, the method of any one of examples 65 through 97, further comprising determining a maximum number of Internet Protocol Packets for bundled delivery from a first layer of a protocol stack to a second layer of the protocol stack and based on the data management indicator.

In Example 99, the method of any one of examples 65 through 98, further comprising Internet Protocol Packet-based voice communications being a real-time critical service.

In Example 100, the method of any one of examples 65 through 99, further comprising an Application layer determining that Internet Protocol Packet-based voice communications is a real-time critical service.

In Example 101, the method of any one of examples 65, and 67 through 100, further comprising determining a level of degradation of the real-time critical service.

In Example 102, the method of example 101, further comprising setting the data management indicator based the level of degradation of the real-time critical service.

In Example 103, the method of examples 101 or 102, further comprising setting the data management indicator to discontinue Internet Protocol Bundling because of degradation of the real-time critical service.

In Example 104, the method of examples 101 or 102, further comprising setting the data management indicator to reduce Internet Protocol Bundling because of degradation of the real-time critical service.

In Example 105, the method of any one of examples 66 through 104, further comprising setting the data management indicator to increase Internet Protocol Bundling when a degradation of the real-time critical service improves.

In Example 106, the method of any one of examples 66 through 105, further comprising setting the data management indicator to restore Internet Protocol Bundling when a degradation of the real-time critical service resolves.

In Example 107, the method of any one of examples 66 through 106, further comprising prohibiting Internet Protocol Bundling only where a degradation of the real-time critical service is present.

In Example 108, the method of any one of examples 66 and 68 through 106, further comprising a real-time critical service being any service that experiences a degradation from Internet Protocol Packet bundling.

In Example 109, the method of any one of examples 66 through 108, further comprising the data management indicator precluding Internet Protocol Packet bundling only when time-critical services are degraded.

In Example 110, the method of any one of examples 66 through 109, wherein an Application layer determines the data management indicator based on a degradation of a Real-Time Critical Service.

In Example 111, the method of any one of examples 66 through 110, further comprising setting the data management indicator to reduce Internet Protocol Bundling only where a Real-Time Critical Service experiences degradation.

In Example 112, the method of any one of examples 66 through 111, further comprising setting the data management indicator to increase Internet Protocol Bundling where degradation of a Real-Time Critical Service improves.

In Example 113, the method of any one of examples 66 through 112, further disclosing a layer of a protocol stack determining a degradation of a real-time critical service and setting a data management indicator because of the degradation of a real-time critical service.

In Example 114, the method of any one of examples 66 through 113, further comprising, for each Internet Protocol Packet received, delivering the Internet Protocol Packet from the first layer of the protocol stack to the second layer of the protocol stack on a transmission time interval immediately after a transmission time interval when the first protocol stack received the Internet Protocol Packet.

In Example 115, the method of any one of examples 66 through 114, further comprising an application layer determining whether a real-time critical service is operating and informing a Packet Data Convergence Protocol of the determination.

In Example 116, the method of example 115, further comprising the Packet Data Convergence Protocol setting the data management indicator for conversational voice services that are routed over a default bearer using the determination received from an application layer.

In Example 117, an apparatus comprising means to perform a method as described in any preceding example.

In Example 118, a circuit configuration for managing Internet Protocol Packet bundling, said circuit configuration comprising:

a sensing circuit, configured to determine whether a real-time critical service is operating on a mobile device;

a logic circuit, configured to determine a data management indicator for the real-time critical service;

a protocol stack management circuit, configured to determine a maximum number of Internet Protocol Packets for bundled delivery from a first layer of a protocol stack to a second layer of the protocol stack, where the real-time critical service is operating, and based on the data management indicator;

wherein the sensing circuit determines whether a real-time critical service is operating on a mobile device;

the logic circuit determines a data management indicator for the real-time critical service;

a protocol stack management circuit determines a maximum number of Internet Protocol Packets for bundled delivery from a first layer of a protocol stack to a second layer of the protocol stack, where the real-time critical service is operating, and based on the data management indicator;

wherein the protocol stack management circuit receives in the first layer of the protocol stack a number of Internet Protocol Packets totaling the maximum number of Internet Protocol Packets for bundled delivery;

wherein, when the maximum number of Internet Protocol Packets for bundled delivery is greater than one, the protocol stack management circuit bundles the maximum number of Internet Protocol Packets for bundled delivery, and delivers the bundled maximum number of Internet Protocol Packets for bundled delivery from the first layer of the protocol stack to the second layer of the protocol stack;

and wherein, when the maximum number of Internet Protocol Packets for bundled delivery is less than two, the protocol stack management circuit delivers Internet Protocol Packets received by the first layer of the protocol stack on a first transmission time interval to the second layer of the protocol stack on a second transmission time interval occurring immediately following the first transmission time interval.

In Example 119, the circuit configuration of example 118, further comprising the circuit configuration being present in a mobile communication device.

In Example 120, the circuit configuration of example 118, further comprising the circuit configuration being present in a desktop computer, laptop computer, tablet computer, or smartphone.

In Example 121, the circuit configuration of example 118, further comprising the circuit configuration being present in a wearable device configured for wireless connectivity.

In Example 122, the circuit configuration of example 118, further comprising the circuit configuration being present in a motor vehicle.

In Example 123, the circuit configuration of example 118, further comprising the circuit configuration being present in a home appliance, a home defense system, a home management system, or a home surveillance system.

In Example 124, a means for management of Internet Protocol Packet bundling, wherein said means:
determines whether a real-time critical service is operating on a mobile device;
determines a data management indicator for the real-time critical service;
where the real-time critical service is operating, and based on the data management indicator, determines a maximum number of Internet Protocol Packets for bundled delivery from a first layer of a protocol stack to a second layer of the protocol stack;
receives in the first layer of the protocol stack a number of Internet Protocol Packets totaling the maximum number of Internet Protocol Packets for bundled delivery;
where the maximum number of Internet Protocol Packets for bundled delivery is greater than one, bundles the maximum number of Internet Protocol Packets for bundled delivery, and delivers the bundled maximum number of Internet Protocol Packets for bundled delivery from the first layer of the protocol stack to the second layer of the protocol stack; and
where the maximum number of Internet Protocol Packets for bundled delivery is less than two, delivers Internet Protocol Packets received by the first layer of the protocol stack on a first transmission time interval to the second layer of the protocol stack on a second transmission time interval occurring immediately following the first transmission time interval.

In Example 125, a means for management of Internet Protocol Packet bundling, wherein said means:
determines whether a real-time critical service is operating on a mobile device;
where the real-time critical service is operating, determines a maximum number of Internet Protocol Packets for bundled delivery from a first layer of a protocol stack to a second layer of the protocol stack;
receives in the first layer of the protocol stack a number of Internet Protocol Packets totaling the maximum number of Internet Protocol Packets for bundled delivery;
where the maximum number of Internet Protocol Packets for bundled delivery is greater than one, bundles the maximum number of Internet Protocol Packets for bundled delivery, and delivers the bundled maximum number of Internet Protocol Packets for bundled delivery from the first layer of the protocol stack to the second layer of the protocol stack; and
where the maximum number of Internet Protocol Packets for bundled delivery is less than two, delivers Internet Protocol Packets received by the first layer of the protocol stack on a first transmission time interval to the second layer of the protocol stack on a second transmission time interval occurring immediately following the first transmission time interval.

In Example 126, a non-transient computer readable medium containing program instructions for causing a computer to perform In Example 1, the method of:
determining whether a real-time critical service is operating on a mobile device;
determining a data management indicator for the real-time critical service;
where the real-time critical service is operating, and based on the data management indicator, determining a maximum number of Internet Protocol Packets for bundled delivery from a first layer of a protocol stack to a second layer of the protocol stack;
receiving in the first layer of the protocol stack a number of Internet Protocol Packets totaling the maximum number of Internet Protocol Packets for bundled delivery;
where the maximum number of Internet Protocol Packets for bundled delivery is greater than one, bundling the maximum number of Internet Protocol Packets for bundled delivery, and delivering the bundled maximum number of Internet Protocol Packets for bundled delivery from the first layer of the protocol stack to the second layer of the protocol stack; and
where the maximum number of Internet Protocol Packets for bundled delivery is less than two, delivering Internet Protocol Packets received by the first layer of the protocol stack on a first transmission time interval to the second layer of the protocol stack on a second transmission time interval occurring immediately following the first transmission time interval.

In Example 127, a non-transient computer readable medium containing program instructions for causing a computer to perform In Example 1, the method of:
determining whether a real-time critical service is operating on a mobile device;
where the real-time critical service is operating, determining a maximum number of Internet Protocol Packets for bundled delivery from a first layer of a protocol stack to a second layer of the protocol stack;
receiving in the first layer of the protocol stack a number of Internet Protocol Packets totaling the maximum number of Internet Protocol Packets for bundled delivery;
where the maximum number of Internet Protocol Packets for bundled delivery is greater than one, bundling the maximum number of Internet Protocol Packets for bundled delivery, and delivering the bundled maximum number of Internet Protocol Packets for bundled delivery from the first layer of the protocol stack to the second layer of the protocol stack; and
where the maximum number of Internet Protocol Packets for bundled delivery is less than two, delivering Internet Protocol Packets received by the first layer of the protocol stack on a first transmission time interval to the second layer of the protocol stack on a second transmission time interval occurring immediately following the first transmission time interval.

In Example 128, a machine-readable medium including code, when executed, to cause a machine to perform In Example 1, the method of any one of examples 66 through 116.

What is claimed is:

1. A method for managing packet bundling said method comprising:
   determining that a real-time critical service is operating on a mobile device;
   identifying a quality of the real-time critical service;
   determining a maximum delay for delivery of data packets from a first layer of a protocol stack to a second layer of the protocol stack, based on the quality of the real-time critical service
   receiving one or more data packets in the first layer of the protocol stack over a duration corresponding to the maximum delay for delivery;
   if the real-time critical service is operating and the quality of the real-time critical service is beneath a predetermined threshold, disabling data packet bundling; and
   delivering the received one or more data packets from the first layer of the protocol stack to the second layer of the protocol stack;
   wherein the quality of the real-time critical service is an error rate or a bit rate of the real-time critical service; and
   wherein the delivered one or more data packets are not bundled.

2. The method of claim 1, further comprising Voice over Internet Protocol being a real-time critical service.

3. The method of claim 1, further comprising Voice over $5^{th}$ Generation being a real-time critical service.

4. The method of claim 1, further comprising real-time gaming being a real-time critical service.

5. The method of claim 1, further comprising an application layer disabling the packet bundling.

6. The method of claim 1, further comprising an application layer reducing the maximum delay for delivery of Internet Protocol Packets data packets.

7. The method of claim 1, wherein the one or more data packets are one or more Internet Protocol Packets.

8. The method of claim 7, wherein the one or more data packets are one or more Protocol Data Units according to a Packet Data Convergence Protocol.

9. The method of claim 1, further comprising determining a real-time critical service to be operating wherein at least one dedicated bearer or default bearer is operating with a Quality of Service Class Identifier of 1, 2, or 3.

10. The method of claim 1, further comprising determining a real-time critical service to not be operating wherein all Quality of Service Class Identifiers are greater than 3.

11. The method of claim 1, wherein the determining that a real-time critical service is operating on a mobile device occurs in an Application layer.

12. The method of claim 1, wherein determining the quality of the real-time critical service further comprises determining a level of degradation of the real-time critical service.

13. The method of claim 1, further comprising enabling data packet bundling if the quality of the real-time critical service is above the predetermined threshold.

14. The method of claim 1, further comprising a real-time critical service being any service that experiences a degradation from packet bundling.

15. The method of claim 1, further comprising enabling data packet bundling when the real-time critical service ends.

16. A circuit configuration for managing packet bundling, said circuit configuration comprising:
   a sensing circuit configured to determine that a real-time critical service is operating on a mobile device;
   a logic circuit configured to identify a quality of the real-time critical service;
   a protocol stack management circuit configured to determine a maximum delay for delivery of data packets from a first layer of a protocol stack to a second layer of the protocol stack based on the quality of the real-time critical service;
   receive the data packets in the first layer of the protocol stack during a period equaling the maximum delay for delivery; if the real-time critical service is operating and the quality of the real-time critical service is beneath a predetermined threshold, to disable data packet bundling, and
   deliver the data packets from the first layer of a protocol stack to the second layer of the protocol stack;
   wherein the quality of the real-time critical service is an error rate or a bit rate of the real-time critical service; and
   wherein the delivered one or more data packets are not bundled.

17. The circuit configuration of claim 16, further comprising the circuit configuration being present in a mobile communication device.

18. The circuit configuration of claim 16, further comprising the circuit configuration being present in a desktop computer, laptop computer, tablet computer, or smartphone.

19. The circuit configuration of claim 16, further comprising the circuit configuration being present in a wearable device configured for wireless connectivity.

20. The circuit configuration of claim 16, further comprising the circuit configuration being present in a motor vehicle.

* * * * *